UNITED STATES PATENT OFFICE.

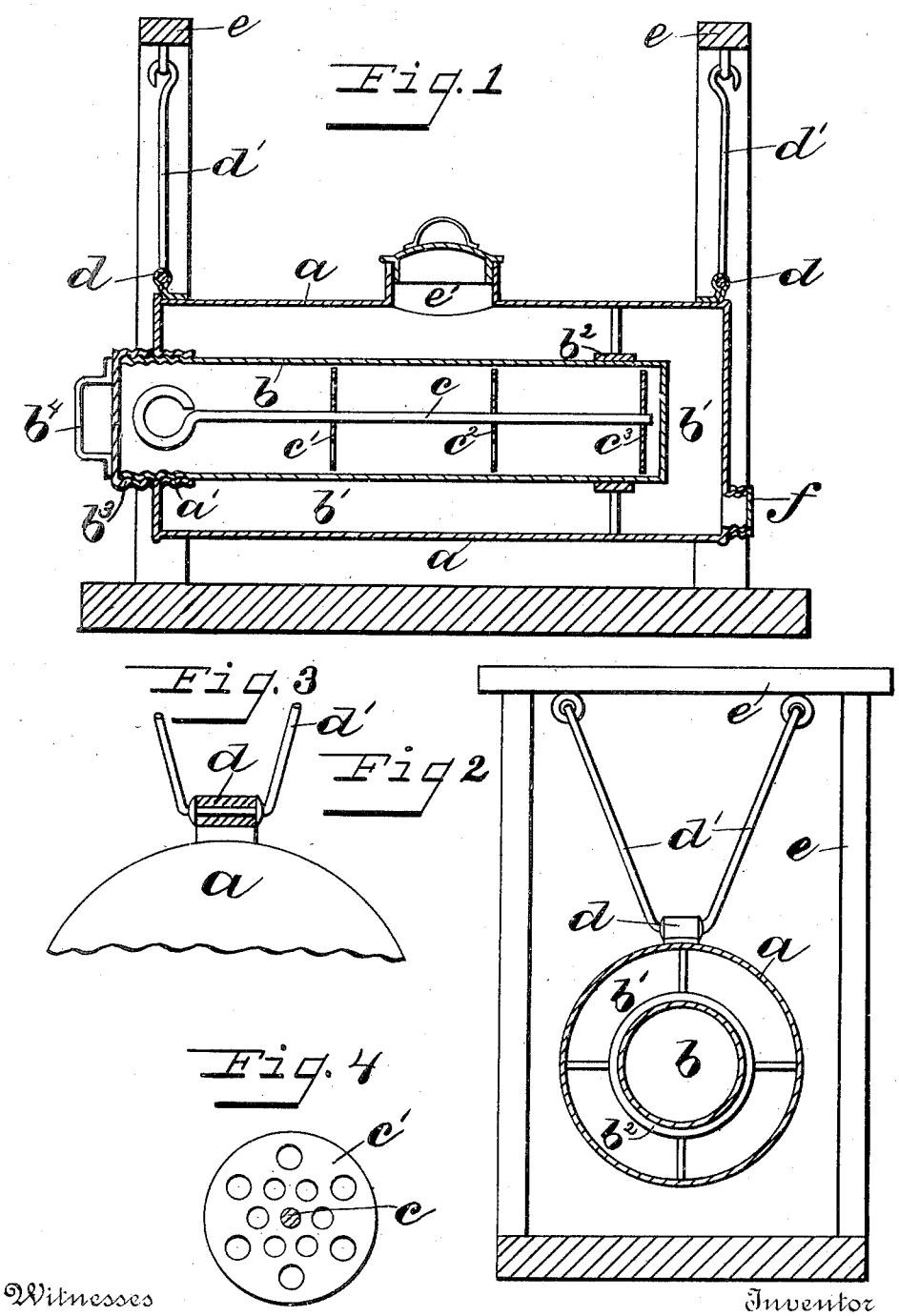

CHARLES J. EDDY, OF SPRINGFIELD, OHIO.

COMBINED CHURN AND ICE-CREAM FREEZER.

SPECIFICATION forming part of Letters Patent No. 642,103, dated January 30, 1900.

Application filed October 5, 1899. Serial No. 732,616. (No model.)

*To all whom it may concern:*

Be it known that I, CHARLES J. EDDY, a citizen of the United States, residing at Springfield, in the county of Clark and State of Ohio, have invented certain new and useful Improvements in a Combined Churn and Ice-Cream Freezer, of which the following is a specification.

My invention relates to a combined ice-cream freezer and churn, the principal object of my invention being to produce a device that will insure either the quick freezing of cream, as a freezer, or the churning of cream to produce butter, as a churner. The device is suspended from frames, so that the cream will be agitated by giving the device a swinging motion.

In the drawings, Figure 1 is a transverse sectional view of my invention. Fig. 2 is a cross-sectional view of same. Figs. 3 and 4 are detail views of parts of my device.

Like parts are represented by similar letters of reference in the several views.

In said drawings, $a$ represents an outer cylindrical can, preferably constructed of sheet metal and of any desired size, according to the required capacity of the machine, said can being closed at one end and having a central circular opening at the opposite end thereof, which opening is provided with screw-threads $a'$. Said outer cylindrical can $a$ is suspended from frames $e$ by links or wires $d'$, threaded through the bearings $d$ and hooked at each end to the eyes or hooks of the frame $e$, as shown in Fig. 2.

The inner can or cream-receptacle $b$, which is of considerably smaller diameter and shorter in length than the outer can $a$, is introduced through the opening in said outer can, and thereby a space $b'$ is thus formed between the inner and outer cans which can be filled with water when churning is desired and with ice when the machine is to operate as a freezer. The open end of the inner can $b$ is also provided with screw-threads which conform to the threads $a'$ of the outer can and accordingly secure the can $b$ in a rigid position. Said inner can or cream-receptacle is supported by a ring $b^2$, which extends around said receptacle near its closed end, as shown in Figs. 1 and 2. When the parts are assembled together, the threaded end of the cam $b$ projects somewhat beyond the end of said outer can $a$, the projecting portion being provided with a screw-cap $b^3$, which prevents the contents of can $b$ leaking out. Said screw-cap $b^3$ is in turn provided with a handle $b^4$, which is intended to be used in screwing or unscrewing the cap $b^3$ and operating the machine during the process of churning or freezing cream. When the machine is to be used as a churn, a dasher is placed within said inner receptacle $b$, which dasher consists of a central rod $c$, with three or more metal disks $c'$, $c^2$, and $c^3$ secured thereto, and all said disks excepting the one nearest the closed end of said receptacle are provided with openings, as shown in Fig. 4, the said disks nearest the closed end being solid, with no openings whatsoever. It is thus readily seen that after the cream has been churned by removing the dasher, with said metal disks, from the inner can or receptacle $b$ the butter will be collected upon the said metal disks.

The bearings $d\ d$ at each end of the outer can, with the hooked links $d'\ d'$ arranged as shown in Figs. 1 and 2, act as braces to prevent any side motion of the machine, and in order that the cans may be placed in an upright position when filled or emptied or for cleaning purposes said links are readily unhooked from the rings or eyes on the frame $e$. The opening $e'$ at the top of the outer can, as shown in Fig. 1, permits the space $b'$ to be filled with water during churning, which will keep the cream at an even temperature, or when the machine is used as a freezer said space $b'$ may be filled with ice and salt. The vent or opening $f$, fitted with a screw-cap near the bottom of said outer can, is for draining said can.

It will thus be seen that I have constructed a simple and extremely useful machine which can readily be changed from a churning-machine to a freezing-machine, or vice versa.

Having thus described my invention, I claim—

1. The combination of an outer can open at one end, supports for said can and links securing said can to said supports, and formed to permit a longitudinal movement only of said can, an inner receptacle of less diameter and shorter in length than said outer can, open at one end and adapted to be supported at its closed end within said outer can, the open end of said inner receptacle extending slightly beyond the open end of said can and adapted to be closed with a cap, and a loose dasher in said inner receptacle having one or more pivoted disks, substantially as specified.

2. The combination of an outer suspended can or receptacle having a screw-threaded opening in the center of one end, frames supporting said can, an inner receptacle of less diameter and shorter length than said outer can, closed at one end and screw-threaded at its open end and adapted to be supported within said outer receptacle at its closed end, and having its open end screw-threaded into the open end of said outer can, and projecting slightly beyond the same, and a screw-threaded cap fitting onto the screw-threaded end of said inner can, substantially as specified.

3. The combination of an outer can supported in a suitable frame, formed with an opening at one end, an opening in the top of said outer can and a small opening at or near the bottom thereof, closed by a cap, an inner receptacle supported in said outer can, said inner receptacle being open at one end, the open end of which projects slightly through and is supported in the opening in said outer can, a cap on one end of said inner receptacle and means for producing a longitudinal movement of said outer can in its supporting-frame, substantially as specified.

In testimony whereof I have hereunto set my hand this 2d day of October, A. D. 1899.

CHARLES J. EDDY.

Witnesses:
   CHAS. I. WELCH,
   EDMOND J. OGDEN.